(12) United States Patent
Gulsvig Wood et al.

(10) Patent No.: US 10,877,813 B2
(45) Date of Patent: *Dec. 29, 2020

(54) RESOURCE CONTROL STACK BASED SYSTEM FOR MULTIPLE DOMAIN PRESENTATION OF CLOUD COMPUTING RESOURCE CONTROL

(71) Applicant: Accenture Global Solutions Limited, Dublin (IE)

(72) Inventors: Catherine Ruth Gulsvig Wood, St. Paul, MN (US); Roberto Javier Torres Sovero, London (GB); Alvin Brown, Austin, TX (US); Billie John Criddle, Paignton (GB)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,117

(22) Filed: Apr. 9, 2020

(65) Prior Publication Data
US 2020/0233720 A1 Jul. 23, 2020

Related U.S. Application Data

(62) Division of application No. 15/925,075, filed on Mar. 19, 2018, now Pat. No. 10,621,004.

(51) Int. Cl.
*G06F 9/50* (2006.01)
*G06F 9/455* (2018.01)
*H04L 29/08* (2006.01)

(52) U.S. Cl.
CPC ........ *G06F 9/5072* (2013.01); *G06F 9/45558* (2013.01); *G06F 9/50* (2013.01);
(Continued)

(58) Field of Classification Search
USPC ......................................................... 709/226
See application file for complete search history.

(56) References Cited

U.S. PATENT DOCUMENTS

2006/0126619 A1* 6/2006 Teisberg ................. H04L 61/25
370/389
2007/0168635 A1 7/2007 Allen et al.
(Continued)

OTHER PUBLICATIONS

Microsoft Azure Cost Management, Cloud Management Platform & Cloud Cost Optimization Tool, dated 2017, pp. 1-4, published online by Cloudyn.
(Continued)

*Primary Examiner* — Hermon Asres
(74) *Attorney, Agent, or Firm* — Brinks Gilson & Lione (57) ABSTRACT

A multi-layer resource control stack based system may generate an availability indication for multiple domains supported by the resource control stack and send the indication to a client node. The client node may respond with a selection of a domain. The client node may also indicate a compute resource to be managed by the resource control stack. In response to the selection from the client node, the resource control stack may initiate a virtual representation of the domain. The client node may interact with the virtual representation to receive recommendations, utilization data, and control information relevant to the compute resource and within a subject area associated with the domain.

20 Claims, 6 Drawing Sheets

(52) U.S. Cl.
CPC .......... *G06F 9/5027* (2013.01); *G06F 9/5077* (2013.01); *G06F 2009/45595* (2013.01); *G06F 2209/5014* (2013.01); *H04L 67/10* (2013.01)

(56) References Cited

U.S. PATENT DOCUMENTS

| | | | |
|---|---|---|---|
| 2013/0080619 A1 | 3/2013 | Assuncao et al. | |
| 2014/0108792 A1* | 4/2014 | Borzycki | H04L 67/32 713/165 |
| 2015/0278061 A1* | 10/2015 | Siciliano | G06F 11/3034 702/186 |
| 2015/0309828 A1* | 10/2015 | Shaik | G06F 9/5083 718/1 |
| 2017/0331829 A1* | 11/2017 | Lander | H04L 67/02 |

OTHER PUBLICATIONS

Cost Management for MSPS, Resellers, & Azure CSP, Cloud Management for MSPs—Monitor & Optimize your Cloud Costs dated 2017, pp. 1-6, published online by Cloudyn.

The Cloud Management Platform, Cloud Cost and Security Management, retrieved May 24, 2018, pp. 1-8, published by CloudChekr, Rochester, NY.

Cloud Security and Compliance, Security and Compliance, retrieved May 24, 2018, pp. 1-8, published by CloudChekr, Rochester, NY.

Resource Inventory and Utilization, Resource Inventory and Utilization, retrieved May 24, 2018, pp. 1-7, published by Cloud Chekr, Rochester, NY.

Scale Your Cloud With Confidence, Platform, retrieved May 24, 2018, pp. 1-8, published online by CloudChekr, Rochester, NY.

Cloud Cost and Expense Management, Cloud Cost Management, retrieved May 22, 2018, pp. 1-6, published by CloudChekr, Rochester, NY.

Self-Healing Cloud Automation, Self-Healing Cloud Automation, retrieved May 24, 2018, pp. 1-6, published by CloudChekr, Rochester, NY.

Blog, retrieved May 24, 2018, pp. 1-5, published by CloudChekr, Rochester, NY.

Extended European Search Report for European Patent Application No. 19160128.5 dated May 7, 2019.

McKittrick, Micah et al., "Tutorial: Create and Manage Windows VMs with Azure Powershell", Windows Virtual Machines Overview, dated May 21, 2018, pp. 22-27, published online by Microscoft Azure.

"How IT Administrators can Deploy a More Effective Cloud," White Paper, retrieved Jun. 5, 2018, pp. 1-5, published online by CloudChekr, Rochester, NY.

"HealthTech Solutions Reducs AWS Infrstructure Costs Using CloudChekr," HealthTech Solutions, retrieved Jun. 5, 2018, pp. 1-3, published online by CloudChekr, Rochester, NY.

"CloudChekr for Microsoft Azure," Solution Brief, retrieved Jun. 5, 2018, pp. 1-2, published online by CloudChekr, Rochester, NY.

* cited by examiner

RESOURCE CONTROL STACK BASED SYSTEM FOR MULTIPLE DOMAIN PRESENTATION OF CLOUD COMPUTING RESOURCE CONTROL

PRIORITY

This application is a divisional of and claims priority to U.S. patent application Ser. No. 15/925,075, filed Mar. 19, 2018, issuing as U.S. Pat. No. 10,621,004, and entitled Resource Control Stack Based System for Multiple Domain Presentation of Cloud Computing Resource Control, which is incorporated herein in its entirety.

TECHNICAL FIELD

This disclosure relates to a system for cloud computing resource control via a resource control stack.

BACKGROUND

Rapid advances in communications and storage technologies, driven by immense customer demand, have resulted in widespread adoption of cloud systems for managing large data payloads, distributed computing, and record systems. As one example, modern enterprise systems presently maintain data records many petabytes in size in the cloud. Improvements in tools for cloud resource allocation and consumption prediction will further enhance the capabilities of cloud computing systems.

DETAILED DESCRIPTION

In cloud computing systems, compute resources such as virtual machines, memory, processor cores, serverless computing threads, multiple-component cloud architectures or other compute resources may be requisitioned for planned or on-demand utilization. Because requisitioning a compute resource is associated with consumption (e.g., expenditures, (non-compute) resource consumption, or other consumption) accurate matching between compute resource demand and supply may increase the resource consumption efficiency of a cloud computing system. Accordingly, there is demand for services providing insights as to expected computing resource consumption and strategies for requisition that meet the expectations with comparatively low expenditures (e.g., as compared to other requisition strategies). For example, the strategies for requisition may include provision of activation state recommendations for compute resources, committed compute reservation recommendations, compute sizing correction recommendations, best practice recommendations (e.g., benchmarking tools, comparison data, or other best practice recommendations), and/or competitive analysis recommendations.

The architectures and techniques discussed provide recommendations for requisitions strategies by determining requisition adjustments for existing cloud architectures. For example, the processing circuitry and resource control stack executing on the processing circuitry, determine requisition adjustments for compute resources designated by a client node. Accordingly, the processing circuitry and resource control stack provide a technical solution to the technical problem of increase efficiency of cloud architecture deployments. In some cases, the processing circuitry and resource control stack may provide additional technical solutions by packaging the requisition adjustments (potentially altered in view of feedback from the client node) into adjustment tokens and providing the adjustment tokens to a requisition interface to implement, at least in part, the requisition adjustments.

The resource control stack may analyze historical utilization data, tagging data and consumption metric data to predict future utilization and produce prescriptive recommendations. Utilization data may include, for example, historical data related to usage or activation of cloud computing resources (e.g., resource allocation history, activation/reservation/committed-use history data), expenditure report data for resource reservation/activation/committed-use, processor activity, memory usage history, computing cycles, data throughput, seasonal usage cycles e.g., holiday schedules, daily usage cycles, weekly usage cycles, quarterly usage cycles or other data. Tagging data may include computing resource-specific data. For example, tagging data may include data provided by an operator, provisioning or configuration management system, or an analyzed system detailing functional groupings (e.g., project-specific allocations, hardware (including virtualized hardware) marked for a specific purpose, availability zones, operating systems applications, installed software, or other groupings), quality of service requirements, minimum allocations, environmental data, license tags, or other data accompanying a resource descriptor. Consumption metric data may include computing resource specific cost metrics such as expenditure-per-time or resource-per-time metrics.

Figure 1:
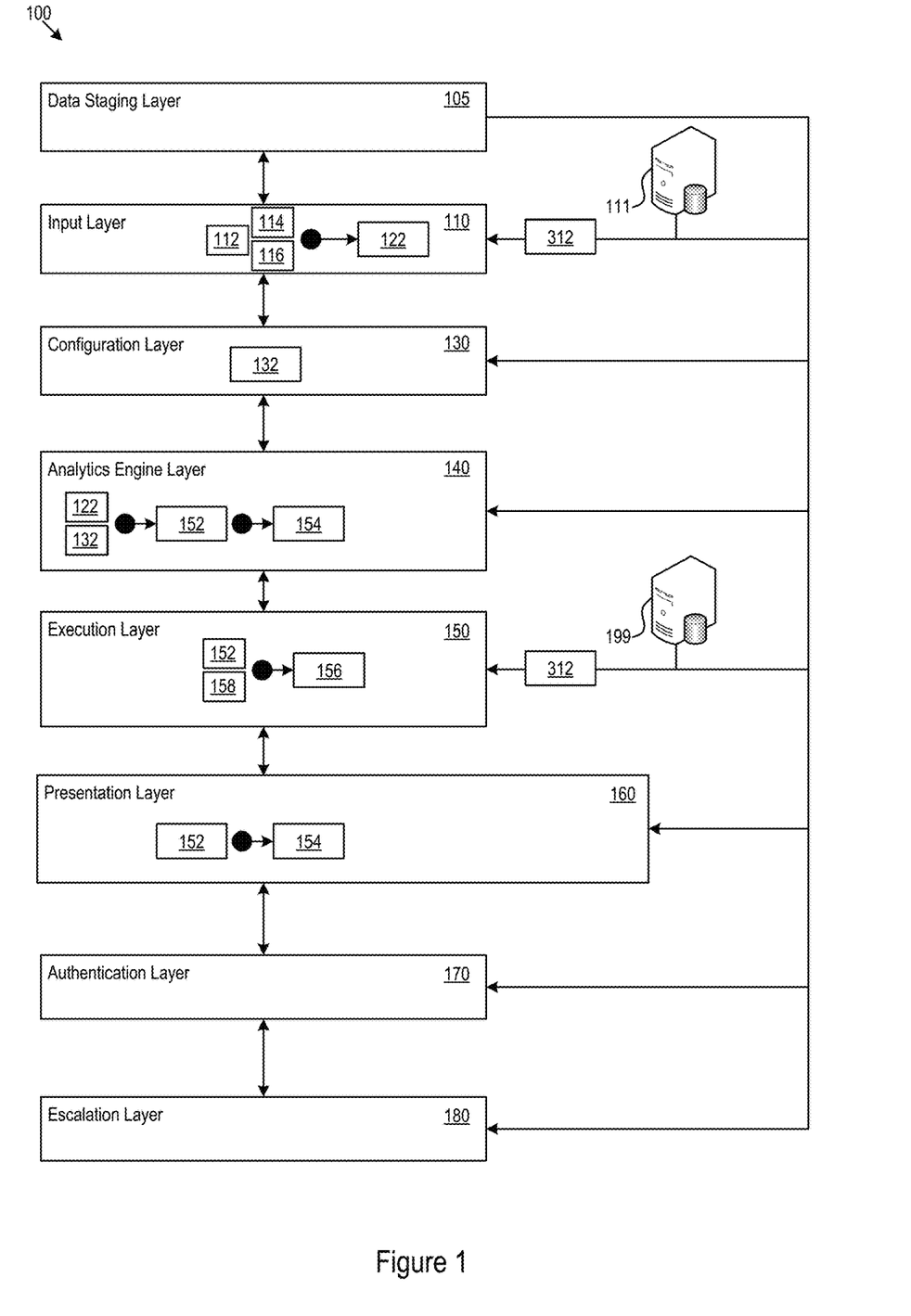
FIG. 1 shows an example multiple-layer resource control stack.

FIG. 1 shows an example multiple layer resource control stack 100, which may execute on processing circuitry making up the hardware underpinning of the resource control stack 100. In this example, the resource control stack 100 includes a data staging layer 105, an input layer 110, a configuration layer 130, an analytics engine layer 140, an execution layer 150, a presentation layer 160, an authentication layer 170, and an escalation layer 180. The resource control stack 100 may include a multiple-layer computing structure of hardware and software that may provide prescriptive analytical recommendations (e.g., static reservation scheduling for virtual machines or other computing resource activation scheduling) through data analysis.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate efficient and accurate data processing. As one example for the resource control stack 100, the data staging layer 105 may provide the input layer 110 with storage resources to store ingested historical utilization data within a database. Hence, the data staging layer 105 may provide a hardware resource, e.g., memory storage resources, to the input layer 110.

Accordingly, the multiple-layer stack architecture of the resource control stack may improve the functioning of the underlying hardware.

The resource control stack 100 may establish multiple domains. The domains may be associated with specific compute resource recommendation topics. In some implementations, each of the domains may be associated with a particular topic. For example, a client node may interact with one domain to receive recommendations related to compute sizing correction, while another domain may provide recommendations on compute resource activation (e.g., power scheduling). Other examples of domain subject areas may include detail information for the compute resource, resource management tools (e.g., for manually performing direct actions on the resource—activating power states, adjusting compute size or other actions), user role and permissions management, committed compute reservation recommendations, best practice recommendations, competitive analysis, or other domain subject areas. The resource control stack may setup the domains by sending a domain availability indicator to the client node. The client node may display virtual representations, such as virtual rooms located along corridor, of the domains. Interaction with the virtual representation of the domain may allow an operator of the client node to receive, from the resource control stack, recommendations pertaining to the topic associated with the domain represented by the virtual representation.

In some cases, a domain may be associated with multiple topics. For example, an example virtual corridor may include a default front domain that may be provided as starting domain prior to selection of an available domain. While interacting with the front domain, the resource control stack may provide summary recommendations listing recommendations compiled from those of other single or few topic domains. An interface available with the front domain may allow an operator of the client node to approve recommendations associated with multiple other domains from a single interface (e.g., a graphical user interface or other user interface).

Figure 2:
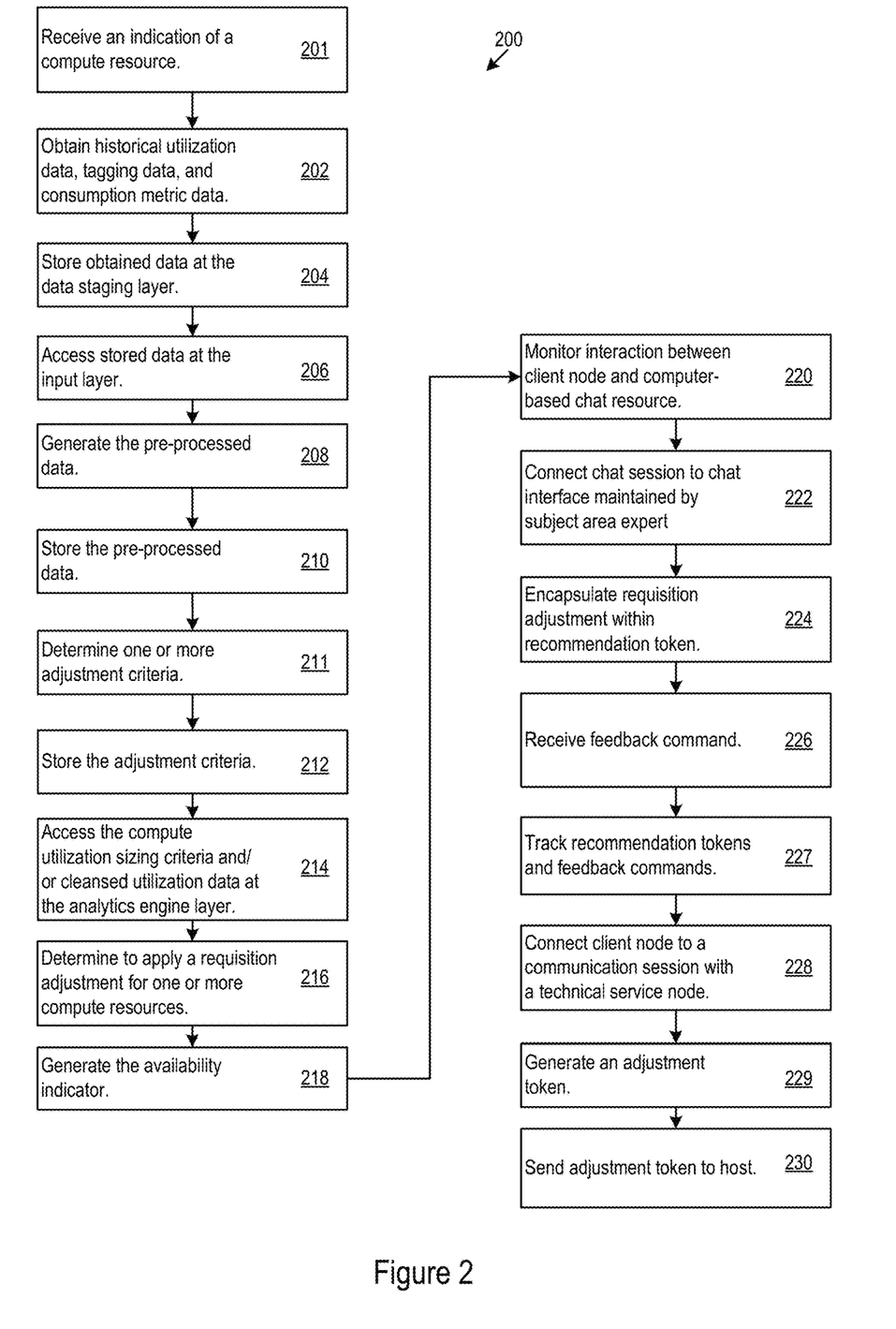
FIG. 2 shows example resource control stack logic.

In the following, reference is made to the resource control stack 100 of FIG. 1 and the corresponding example resource control stack logic (RCSL) 200 in FIG. 2 in the context of the resource control system. FIG. 2 illustrates the logical flow structure of the example RCSL 200. The logical features of RCSL 200 may be implemented in various orders and combinations. For example, in a first implementation, one or more features may be omitted or reordered with respect to a second implementation. The RCSL 200 may mediate an interaction between a client node the resource control stack 100 operating within a resource control system. The RCSL 200 may access a communications link (e.g., a transport thread, network socket layer connection, bus link, or other communications link) established between network interface circuitry and a client node.

The RCSL 200 may receive an indication of a compute resource from the client node (201). The indication may designate virtually any compute resource associated with the client node (e.g., any resource requisitioned under authority associated with the client node or other association type). The designated compute resource may include virtual machine, storage resources, multiple-component architectures or other compute resources as discussed above.

At the input layer 110 of the resource control stack 100, the RCSL 200 may obtain historical utilization data 112, consumption metric data 114, and tagging data 116 (202) and then store the obtained data at the data staging layer 105 (204). In some cases, the historical utilization data 112, consumption metric data 114, and tagging data 116 may be received via communication interfaces (e.g., communication interfaces 312, discussed below). The historical utilization data 112, consumption metric data 114, and tagging data 116 may be accessed at least in part, e.g., via the communication interfaces 312, from data sources 111, which may include, for example, cloud compute utilization databases, cloud expenditure databases, master virtual machine cost databases, committed-use history databases, virtual machine family/template description data, infrastructure/project tags or other data sources. The historical utilization data 112 may be provided by cloud compute utilization databases, cloud expenditure databases, committed-use history databases, or other utilization data sources. The consumption metric data 114 may be provided by cloud expenditure databases, master virtual machine cost databases, virtual machine family/template/platform as a service, description data, or other consumption metric data sources. The tagging data 116 may be provided by virtual machine family/template description data, infrastructure/project tags or other tagging data sources.

After the historical utilization data 112, consumption metric data 114, and tagging data 116 are obtained and stored, the input layer 110 may access the some or all of the stored data (206) using memory resources passed from the data staging layer 105 (e.g., memory access resources). The input layer 110 may process the historical utilization data 112 to generate a pre-processed data 122 for the compute resources (208). For example, the input layer 110 may reformat historical utilization data obtained from multiple sources into a common format for analysis. The common format may be a selected format to which data in other formats are translated. In some cases, the pre-processed data 122 may include a time-correlated history and cycle analysis of past computing resource usage to facilitate determination of likely patterns of future usage, e.g., for individual compute resources, compute resources within a functional group, or other groups of compute resources.

In some cases, the techniques and architectures used in conjunction with an activation timetable stack such as that described in U.S. patent application Ser. No. 15/811,339, filed Nov. 13, 2017, entitled Prescriptive Analytics Based Activation Timetable Stack for Cloud Computing Resource Scheduling, which is entirely included herein by reference, may be used to perform or assist in generation of the pre-processed data 122. Therein, the input layer of the activation timetable stack may parse historical utilization data, consumption metric data, and tagging data to identify patterns at multiple timescales. The input layer of the activation timetable stack may then generate time-correlated consumption data, which may be implemented as the pre-processed data 122. In an illustrative scenario of how the resource control stack 100 may utilize the activation timetable stack outputs, the parsing of the historical utilization data, consumption metric data, and tagging data, done by the input layer of the activation timetable stack may be implemented by the input layer 110 of the resource control stack to generate the pre-processed data 122 (208).

In some cases, the techniques and architectures used in conjunction with a committed compute reservation (CCR) stack such as that described in U.S. patent application Ser. No. 15/922,659, filed Mar. 15, 2018, entitled Prescriptive Analytics Based Committed Compute Reservation Stack for Cloud Computing Resource Scheduling, which is incorporated by reference in its entirety, may be used to perform or assist in generation of the pre-processed data 122. Therein, the input layer of the CCR stack may parse historical utilization data, consumption metric data, and tagging data to identify time cycles or time-independent features present within the stored data. The input layer of the CCR stack may then generate time-mapping data, which may be implemented as the pre-processed data 122. In an illustrative scenario of how the resource control stack 100 may utilize the CCR stack outputs, the parsing of the historical utilization data, consumption metric data, and tagging data, done by the input layer of the CCR stack may be implemented by the input layer 110 of the resource control stack to generate the pre-processed data 122 (208).

In some cases, the techniques and architectures used in conjunction with a compute-sizing correction (CSC) stack such as that described in U.S. patent application Ser. No. 15/922,650, filed Mar. 15, 2018, entitled Prescriptive Analytics Based Compute Sizing Correction Stack for Cloud Computing Resource Scheduling, which is incorporated by reference in its entirety, may be used to perform or assist in generation of the pre-processed data 122. Therein, the input layer of the CSC stack may parse historical utilization data, consumption metric data, and tagging data to identify weekly, monthly, holiday, seasonal, or other time cycles present within the stored data. Further, the input layer of the CSC stack may determine time-independent features that may be applied to data from any time period. The input layer of the CSC stack may then generate cleansed utilization data, which may be implemented as the pre-processed data 122. In an illustrative scenario of how the resource control stack 100 may utilize the CSC stack outputs, the parsing of the historical utilization data, consumption metric data, and tagging data, done by the input layer of the CSC stack may be implemented by the input layer 110 of the resource control stack to generate the pre-processed data 122 (208).

To generate the pre-processed data 122, the input layer 110 may determine one or more timescales (e.g., timescales including time-invariant contributions) present within the data. For example, the input layer 110 may apply various frequency analyses to the data to determine periodic, aperiodic, and/or time-invariant trends. Additionally or alternatively, the input layer 110 may apply rule-based analyses such as holiday schedules, operational hours, or annual enterprise cycles that may be expressly defined by rules or through inferential analysis.

Once the pre-processed data 122 is generated, the input layer 110 may store the pre-processed data 122, via a database operation at the data staging layer 105 (210). For example, the pre-processed data 122 may be stored on storage dedicated to the RCSL 200. Additionally or alternatively, the pre-processed data 122 may be stored on a shared database or cloud storage. Accordingly, the data staging layer 105 may further access network resources (e.g., via communication interfaces 312, discussed below) to implement memory resource provision to the other layers. In an example implementation, the RCSL 200 may be defined within a Revolution-R environment. However, other design platforms may be used. The input layer 110 may also filter the pre-processed data (or the historical utilization data 112, consumption metric data 114, and tagging data 116 prior to processing) for data relevant to the compute resource indicated by the client node.

At the configuration layer 130 of the resource control stack 100, the RCSL 200 may determine one or more adjustment criteria 132 responsive to the available domains supported by the resource control stack. In some cases, the RCSL 200 may determine the adjustment criteria 132 for domains selected by the control node. In some cases, the RCSL 200 may determine adjustment criteria 132 for all domains (e.g., to be applied in multiple recommendations across multiple sessions with multiple different client nodes).

The adjustment criteria 132 may include different adjustment criteria for different domains. For example, for domains associated with computer sizing correction recommendations, compute utilization sizing criteria may be used as adjustment criteria 132. The compute utilization sizing criteria may include threshold values, values for extrema (e.g., minimum, maximum), averages, or other criteria for determining when and how strongly to apply compute sizing correction.

Additionally or alternatively, for domains associated with compute resource activation, the adjustment criteria may include example adjustment criteria such as utilization thresholds for guaranteed activation during a defined period, deactivation either for a temporary or extended period, comparative utilization percentiles (for activation or deactivation) or other guidelines for activation states.

Additionally or alternatively, for domains associated with committed compute reservation, the adjustment criteria may include example adjustment criteria such as utilization thresholds for reserving committed compute resources, comparative utilization percentiles designating resources as committed compute or other guidelines for committed compute reservation.

In some implementations, for domains associated with comparative recommendations, such as benchmarking and best practices, the adjustment criteria may include a listing of example benchmark values, deployment templates, example compute architectures, or other reference data.

The adjustment criteria 132 may be supplied via operator input, e.g., via the interaction with an interface on the control node. In some implementations, the adjustment criteria may be defaults supplied via expert input to the resource control stack 100. In some cases, preferences from the control node may supplant defaults for compute resources associated with the control node.

Once the RCSL 200 determines the adjustment criteria 132 (211), the RCSL 200 may store the compute adjustment criteria 132 via operation at the data staging layer 105 (212).

The analytics engine layer 140 may access the pre-processed data 122 and/or the adjustment criteria 132 using a memory resource provided by the data staging layer 105 (214). For example, the data staging layer 105 may provide a memory read resource (such as a SQL database read resource) to the analytics engine layer 140 to allow access to the pre-processed data 122.

Using the pre-processed data 122 and/or the adjustment criteria 132, the RCSL 200, at the analytics engine layer 140, may determine to apply requisition adjustment 152 for one or more compute resources (216). The determination may include predicting future utilization based on the time patterns extracted in the pre-processed data 122 generated at the input layer (or received, e.g., from an activation timetable stack, a CSC stack, a CCR stack, or any combination thereof at the input layer).

In some implementations, the RCSL 200 may determine activation schedules by accessing an activation timetable, such as that generated by a committed activation timetable stack such as that described in U.S. patent application Ser. No. 15/811,339, filed Nov. 13, 2017, entitled Prescriptive Analytics Based Activation Timetable Stack for Cloud Computing Resource Scheduling, incorporated by reference above. The activation timetable may provide an activation schedule for compute resources that may be used to make power scheduling recommendations.

In some implementations, the RCSL 200 may determine statically and dynamically reserved computing resources by accessing a reservation matrix, such as that generated by a CCR stack such as that described in U.S. patent application Ser. No. 15/922,659, filed Mar. 15, 2018, entitled Prescriptive Analytics Based Committed Compute Reservation Stack for Cloud Computing Resource Scheduling, incorporated by reference above. The reservation matrix may detail a distribution of statically and dynamically computing resources that may be used to make committed compute recommendations.

In some implementations, the RCSL 200 may determine adjustments to committed compute sizing by accessing a CSC trajectories and/or CSC cycle adjustments, such as those generated by a CSC stack such as that described in U.S. patent application Ser. No. 15/922,650, filed Mar. 15, 2018, entitled Prescriptive Analytics Based Compute Sizing Correction Stack for Cloud Computing Resource Scheduling, incorporated by reference above. The reservation matrix may detail a distribution of statically and dynamically computing resources.

In other words, in some implementations, the resource control stack 100 may determine requisition adjustments 152 by coordinating recommendations from the activation timetable stack, the CCR stack, the CSC stack, or a combination thereof.

In some implementations, the resource control stack 100 may include the analytic frameworks of the activation timetable stack, the CCR stack, and/or the CSC stack to support on-stack determination of requisition adjustments 152 rather than delegating determination of the requisition adjustment 152 to a specialized stack.

In some implementations, the client node may send the RCSL 200 a credential. For example, the credential may include a digital certificate, a digital signature, a passcode, a cryptographic primitive, or other trust-establishing identifier. At the authentication layer 170, the RCSL 200 may authenticate the credential and verify that the compute resource designated by the client node is properly controlled by the client node.

At the presentation layer 160, the RCSL 200 may generate a domain availability indicator that designates the available domains supported by the resource control stack 100 (218). The RCSL may send the domain availability indicator to the client node to provide the client node with a selection of domains from which recommendations can be sought.

Responsive to the domain availability indicator, the RCSL 200 may receive a domain selection from the client node. The domain selection may indicate which of the multiple available domains the client node intends to enter and interact with.

In some implementations, prior to receiving a selection from among the available domains from the client node and, in some cases, prior to sending the domain availability indicator, the RCSL 200 may cause the client node to interact with a front domain. The front domain may include a default domain that may operate as a platform from which to provide summary recommendations for multiple ones of the multiple domains supported by the RCSL. Accordingly, the command from the client node sent responsively to recommendations provided within the front domain may implement recommendations from multiple domains without the client node necessarily interacting directly with each of the individual ones of the multiple domains. In some implementations, the client node may select the front domain. Accordingly, the client node may return to or initially visit the front domain after interacting with other domains.

Upon determining which domain at client node is entering, the RCSL 200, at the presentation layer 160, may initiate generation of a virtual representation of the selected domain. In some cases, generating a virtual representation of a given domain may include rendering a virtual space, for example a 3D room or other virtual space). The virtual representation of the domain may include tool and/or displays for viewing recommendations, providing feedback commands 158 responsive to the recommendations, and/or executing the recommendations.

In some implementations, the virtual representation may include a chat platform or other communications channel to a technical service node for the subject area of the domain. An operator of the client node may communicate with the technical service node to get additional information pertaining the recommendations and/or the domain. For example, the technical service node may be staffed by a subject area expert for the subject area of the domain.

In some implementations, upon launching the chat platform or other communication session in response to a chat request from the client node, the technical service node may first interact with the client node through a chat algorithm, artificial intelligence, chat bot, or other computer-based chat resource. The computer-based chat resource may provide the client node with initial information and handle initial queries from the client node.

In some cases, the interaction between the client node and the computer-based chat resource may be monitored by the escalation layer 180 of the resource control stack 100 (220). The escalation layer 180 may monitor the interaction for one or more escalation criteria. For example, escalation criteria may include requests from the client node for a "manager" (e.g., in cases where client node may be unaware the interaction is initially with a computer-based chat resource), requests for an expert, requests for a "human," indications of dissatisfaction, readiness to implement a service change, indications of confusion, indication from the computer-based chat resource that the resource is unable or not-authorized to response to a particular request from a client node, or other conditions in which the computer-based chat resource is unable to provide a response to a client node interaction.

In response to detecting an escalation criterion, the RCSL 200 (via the escalation layer 180) may connect the chat session for the client node to a chat interface maintained by a subject area expert or other individual of authority (222) for the technical service node.

Referring again to the requisition adjustment 152, after generating the virtual representation of the selected domain, the RCSL 200 may encapsulate the determined requisition adjustment 152 for the selected domain within a recommendation token 154 (224). The recommendation token 154 may provide transfer encapsulation for the information stored, e.g., via the data staging layer 105, in connection with the requisition adjustment 152. Accordingly, the recommendation token 154 may include a data structure with one or more data fields. The data fields may, for example, include a set of actions or script for implementing the requisition adjustment 152 as proposed, data on consumption savings or other benefits associated with the requisition adjustment 152 or other efficiency data, utilization data (e.g. before and after implementation of the requisition adjustment 152), alternative implementation options (e.g., for more or less aggressive consumption savings), or other data fields. In some cases, the recommendation token 154 may include a header to ensure proper identification and association of the data field payloads in the recommendation token 154. Accordingly, the recommendation token 154 may provide a technical solution to the problem of efficiently and accurately classifying data (e.g., by domain) sent out by the RCSL 200.

In some cases, the recommendation token 154 may include a CRC or other checksum and/or a digital signature. Accordingly, the recommendation token 154 may provide a technical solution of ensuring against data corruption and/or ensuring data authenticity.

In response to the recommendation token 154, the RCSL 200 may receive, from the client node, a feedback command 158 (226). The feedback command 158 may include acceptance of the requisition adjustment 152 encapsulated within the recommendation token 154 without alteration. Additionally or alternatively, the feedback command 158 may include an alteration to the requisition adjustment 152. For example, the feedback command 158 may instead include an acceptance of an alternative recommendation included within the recommendation token 154. In the same or another example, the feedback command 158 may include a manually entered alteration to the requisition adjustment 152.

In the case of the front domain, the RCSL 200 may send a summary recommendation token 154 encapsulating summary information for requisition adjustments 152 for some or all of the available domains. In some cases, the summary recommendation token 154 may include details of the requisition adjustment 152 for the multiple domains but omit a portion of the supporting information regarding the requisition adjustments 152 to support a summary presentation of the requisition adjustments 152. The client node may then interact with individual domains to receive detailed supporting information on the various requisition adjustments 152 for the individual domains.

The RCSL 200 may track alterations to the requisition adjustments 152 that the RCSL 200 provides. The RCSL 200 may be used the tracked feedback commands 158 similarly to open loop control of the RCSL's requisition adjustments 152. Accordingly, the RCSL 200 may implement open loop feedback control by incorporating insights from previous feedback commands 158 into future requisition adjustments. For example, the RCSL 200 may determine that a particular client node may prefer requisition adjustment 152 that offer more (or less) aggressive consumption savings than particular benchmark or best practice metrics. The RCSL 200 may incorporate these insights to increase the accuracy, efficiency, and utility of the RCSL's requisition adjustments 152.

Additionally or alternatively, the escalation layer 180 may track recommendation tokens 154 and feedback commands 158 to determine whether a recommendation token 154 may be insufficient (227). The escalation layer 180 may maintain one or more insufficiency criteria for recommendation tokens 154. In an example, the insufficiency criteria may include an absence of or incomplete requisition adjustment 152 within the recommendation token 154. The absence or incompleteness may indicate that the RCSL 200 was unable to determine a requisition adjustment 152 for the particular compute resource and/or the particular client node. In some cases, the RCSL 200 may not necessarily be able to generate recommendations all compute resources in view of the particularized requirements of client nodes or some compute resources. Rather than sending a recommendation token 154 indicating that no requisition adjustment 152 can be generated, the RCSL 200 may instead determine that the recommendation token 154 meets and insufficiency criteria. In another illustrative example, the insufficiency criteria may also include classes of feedback responses. Feedback expressly indicating dissatisfaction with a particular requisition adjustment 152 or feedback command 158 with alterations above a threshold level may meet insufficiency criteria for their associated recommendation tokens 154.

Once a recommendation token 154 is identified as insufficient, the RCSL 200 may (via the escalation layer 180) connect the client node to a communication session with a technical service node (228). In some implementations, the RCSL 200 may initiate the communication session with a computer-based chat resource after an insufficiency criterion is met. However, in some cases after a recommendation token 154 has met an insufficiency criterion, the RCSL 200 may escalate the communication session with the technical service node beyond the computer-based chat resource. The RCSL may escalate because the insufficiency of the recommendation token 154 may be an indication that automated resources are not sufficient to meet the particularized requirements of client node or some compute resource.

In some implementations and in response to the requisition adjustment 152 and/or the feedback command 158, the RCSL 200 may, at the execution layer 150, generate an adjustment token 156 (229). The adjustment token 156 may include a script and/or set of instructions for a requisition control interface for a host 199 that provides the compute resource. The script may implement the requisition adjustment 152 (e.g., as altered/accepted by the feedback command 158) on the compute resource. For example, the script may include instructions for executing a compute-sizing correction on the compute resource. In various implementations, the adjustment token may differ from the recommendation token 154 in that the adjustment token may include alterations from the feedback command 158 and, in some cases, omit supporting data on the requisition adjustment 152 that may have optionally been included in the recommendation token 154 to support a presentation of the benefits of the requisition adjustment 152 at the client node. In addition, the adjustment token may be formatted specifically to be executable at the host. In some implementations, the adjustment token 156 may include an activation timetable generated by the activation timetable stack, a reservation matrix generated by the CCR stack, or a CSC adjustment generated by the CSC stack as discussed above. After generation of the adjustment token, the RCSL 200 may send the adjustment token to the host 199 (230).

In various implementations, the adjustment token 156 may include commands, scripts, or other code to cause host interfaces for controlling the respective compute resources to implement the requisition adjustments 152. For example, services such as Amazon® Web Services (AWS), Google® Compute Engine, Microsoft® Azure, or other cloud computing services, may maintain host interfaces (e.g., web interfaces, application programming interfaces, or other interfaces) by which clients may define operation of the computing resources. For requisition adjustments that may be implemented over time, the RCSL 200 may also use a scheduling proxy system that uses the requisition adjustment, and operator command data to maintain schedules, calling the service provider's application programming interfaces, e.g., by sending a adjustment token, for each requisition adjustment control action defined by the schedules.

Figure 3:
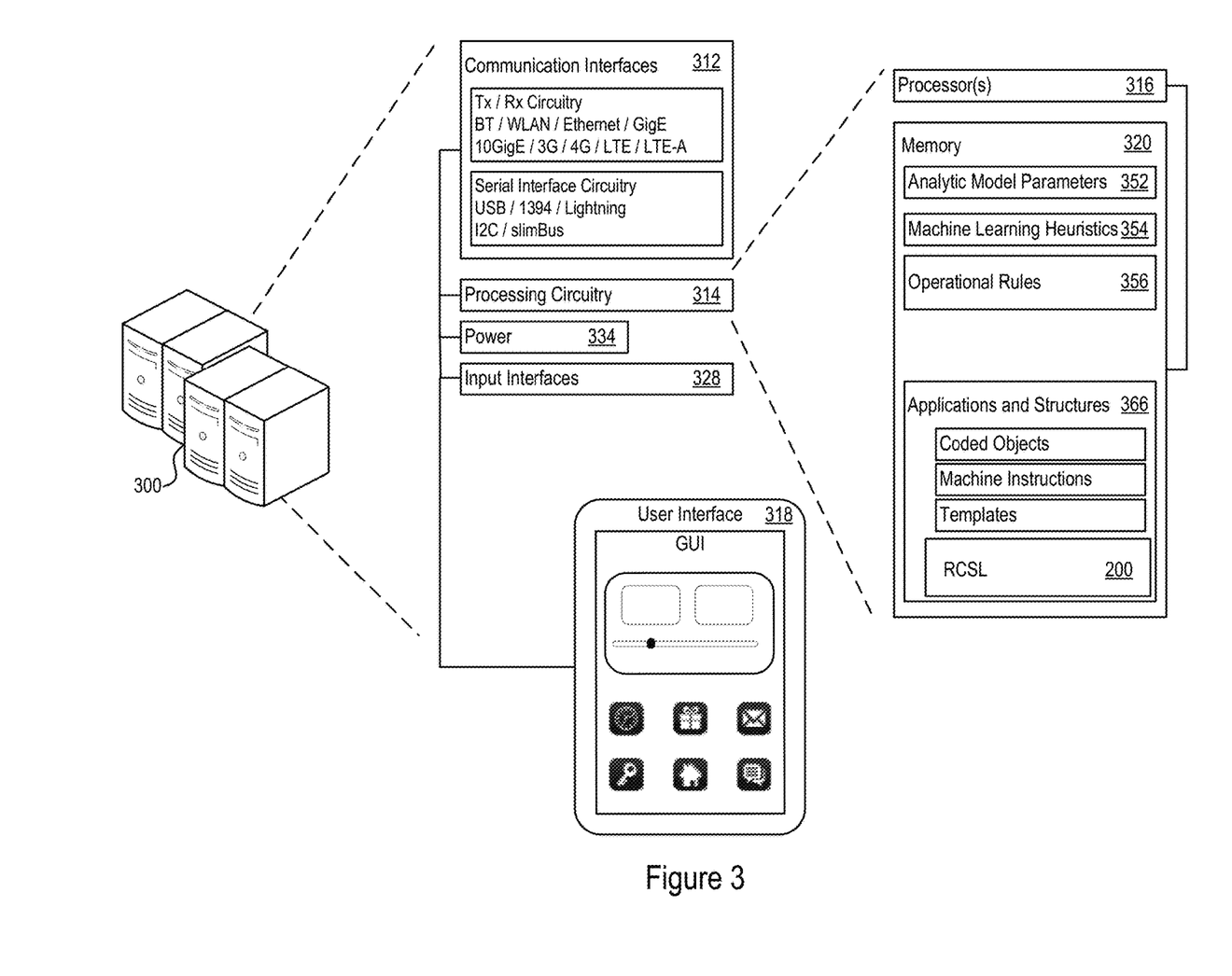
FIG. 3 shows an example specific execution environment for the resource control stack of FIG. 1.

FIG. 3 shows an example execution environment 300 for the resource control stack 100 described above. The execution environment 300 may be implemented on centralized hardware or in distributed forms, as discussed below. The execution environment 300 may include processing circuitry 314 to support execution of the multiple layers of resource control stack 100 described above. The processing circuitry 314 may include processors 316, memory 320, and/or other circuitry.

The memory 320 may include analytic model parameters 352, machine learning heuristics 354, and operational rules 356. The memory 320 may further include applications and structures 366, for example, coded objects, machine instructions, templates, or other structures to support pre-processed data generation or other tasks described above. The applications and structures may implement the RCSL 200.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, $I^2C$, slimBus, or other serial interfaces. The communication interfaces 312 may be used to support and/or implement remote operation of the resource control stack 100. The execution environment 300 may include power functions 334 and various input interfaces 328. The execution environment may also include a user interface 318 that may include human-to-machine interface devices and/or graphical user interfaces (GUI). The user interface 318 may be used to support and/or implement local operation of the resource control stack 100. In various implementations, the processing circuitry 314 may be distributed over one or more physical servers, be implemented as one or more virtual machines, be implemented in container environments such as Cloud Foundry or Docker, and/or be implemented in serverless (functions as-a-service) environments.

In some cases, the execution environment 300 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the resource control stack 100, of the execution environment onto the hardware resources. In some cases, a manifest may be stored as a preference file such as a YAML (yet another mark-up language), JSON, or other preference file type.

Figure 4:
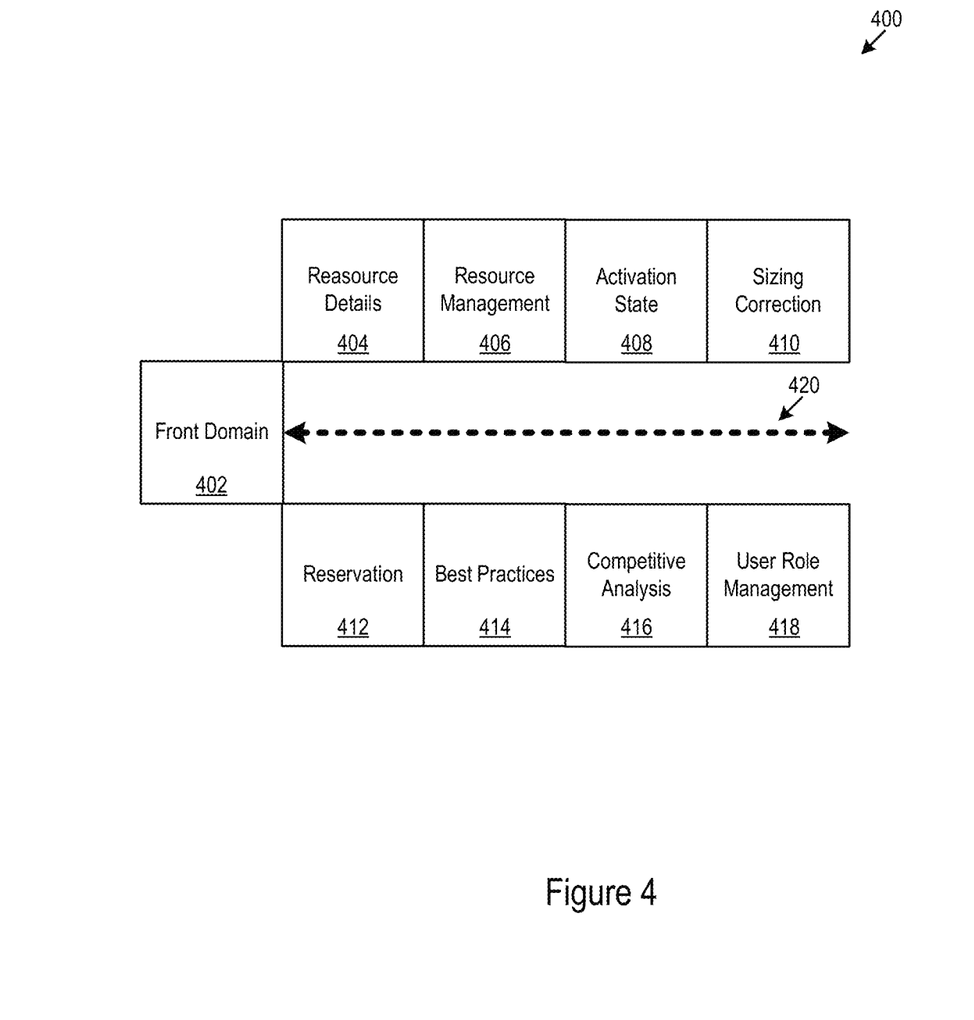
FIG. 4 shows an example multiple domain virtual space.

Referring now to FIG. 4, an example multiple domain virtual space 400 is shown. In the example multiple domain virtual space 400, the client node may arrive at the virtual representation of the front domain 402. The client node may receive summary recommendations and overview information at the virtual representation of the front domain 402. The client node may progress on to other subject matter specific domains such as, compute resource details 404, compute resource management 406, activation state recommendations 408, compute sizing correction recommendations 410, committed compute reservation recommendations 412, best practices and benchmarking 414, competitive analysis 416, user role management 418 or other subject area specific domains. In some cases, the virtual space 400 may be organized visually as a corridor 420 with subject area specific rooms attached to the corridor 420.

Figure 5:
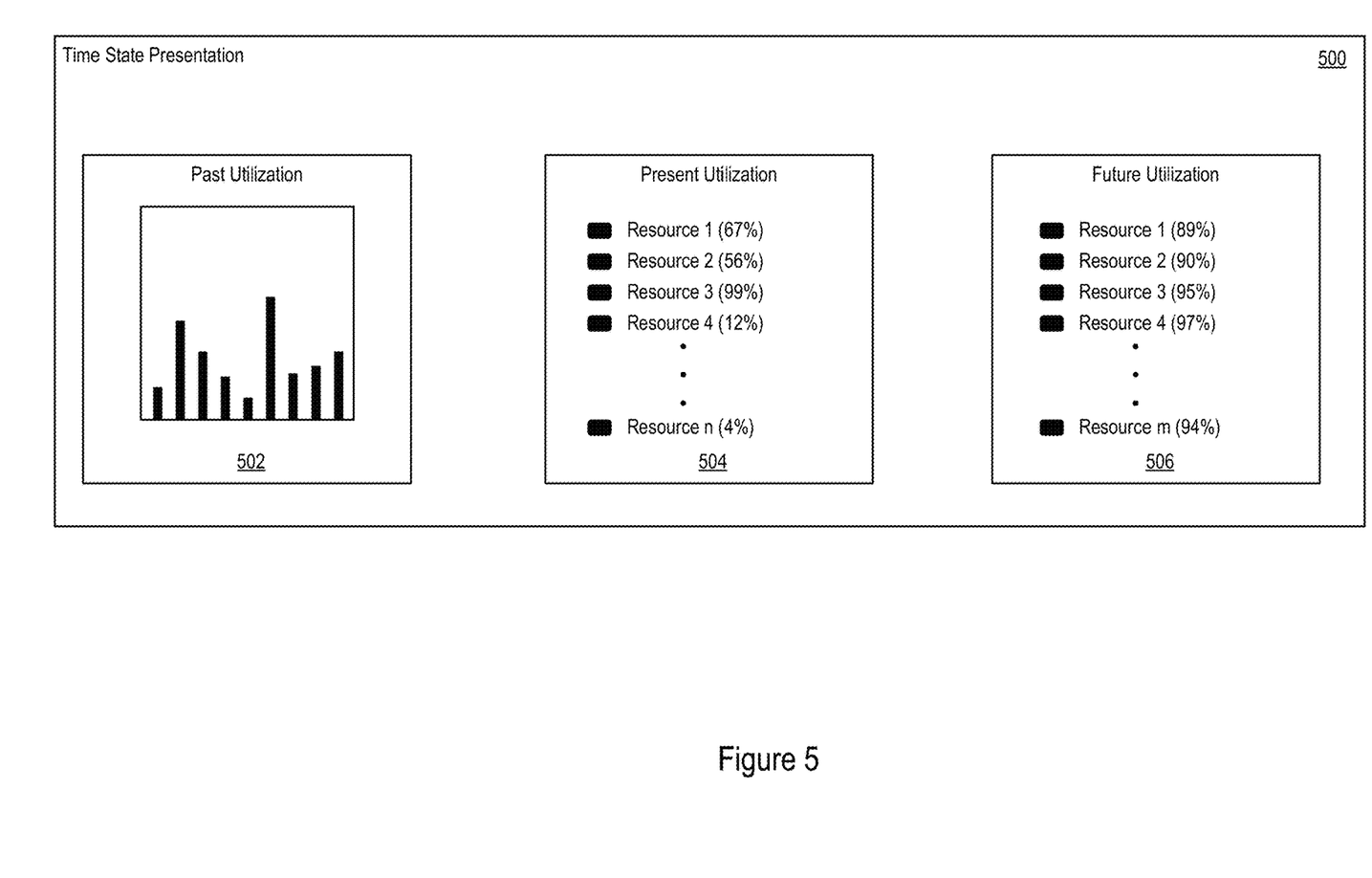
FIG. 5 shows an example time state presentation for a compute resource.

Referring now to FIG. 5, shows an example time state presentation 500 for a compute resource. To support computing recommendations, the RCSL 200 may generate forecasted utilization data at the analytic engine layer 140 of the resource control stack. In using the pre-processed data in conjunction with forecasted utilization data, the RCSL 200 may generate a time state presentation. In the example time state presentation of FIG. 5, utilization data for the past 502, present 504, and future 506 (e.g., forecasted) may be presented individually or simultaneously. In some cases, simultaneous presentation may facilitate comparisons between utilization for the different time states.

Figure 6:
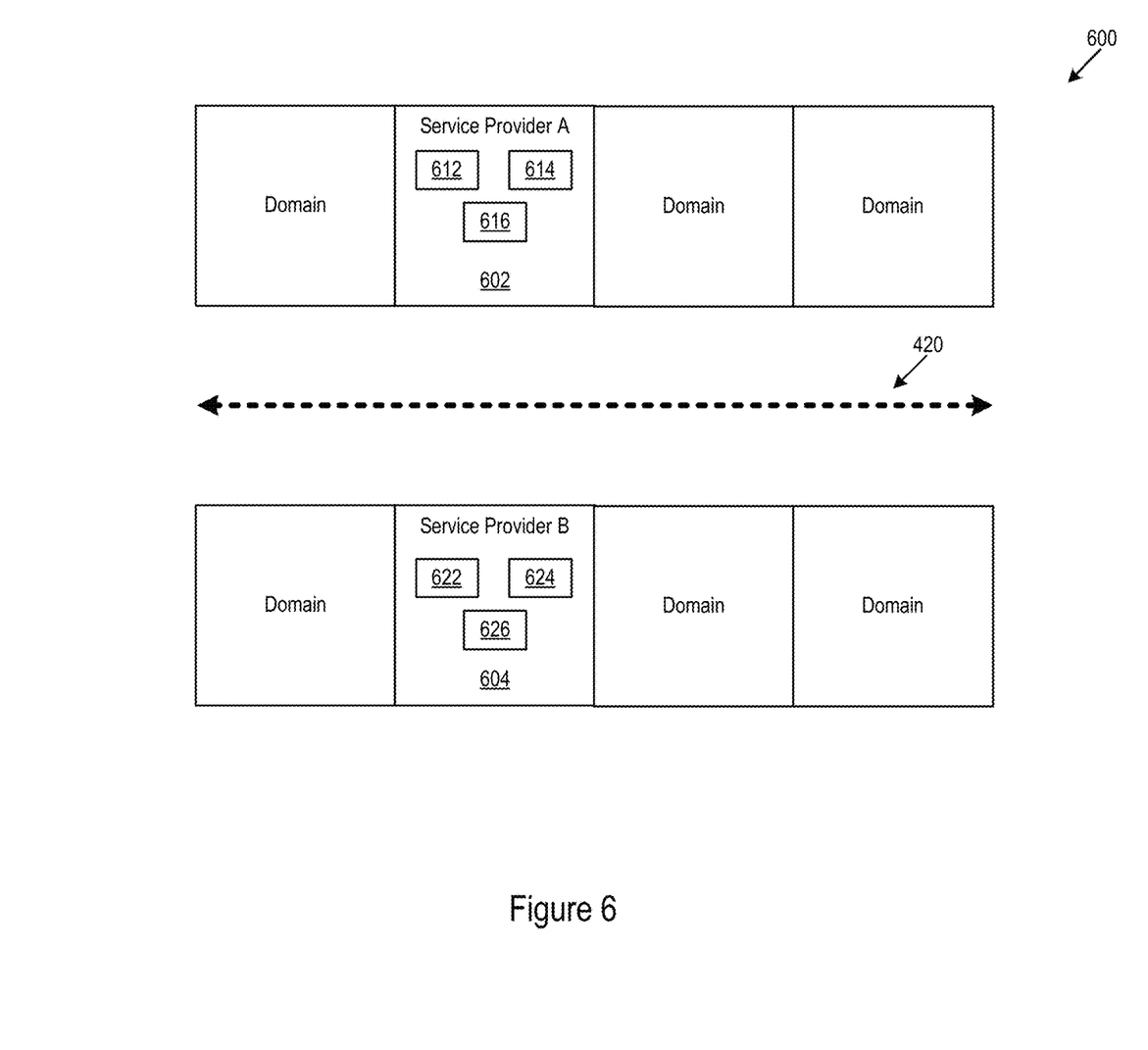
FIG. 6 shows an example service provision interface.

FIG. 6 shows an example service provision interface 600. The resource control stack 100 may facilitate provision of services to the compute resource. The RCSL 200 may generate domains associated with the third party services and/or service providers. Via interaction with the virtual representations of the associated domains, the client node may select, activate, and/or deactivate services. In some cases, the services may include third-party services requisitioned by the RCSL 200 on behalf of the client node for the compute resource. The example service provision interface 600 includes domains 602, 604 associated with service providers A and B. The domain 602 for service provider A may provide multiple service selections 612, 614, 616. The domain 604 for service provider B may also provide multiple service selections 622, 624, 626.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in tangible storage media that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on other machine-readable media. The media may be made-up of a single (e.g., unitary) storage device, multiple storage devices, a distributed storage device, or other storage configuration. A product, such as a computer program product, may include storage media and instructions stored in or on the media, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above.

A1 In an example, a system includes: network interface circuitry configured to: establish a communication link with a client node; receive an indication of a compute resource associated with the client node; send a domain availability indicator designating multiple domains within a resource control environment; receive a domain selection indicating a selected domain from among the multiple domains; and send a selected recommendation token to the client node over the communication link; and processing circuitry in data communication with the network interface circuitry, the processing circuitry configured to execute a resource control stack including: a data staging layer; an input layer; a configuration layer; an analytics engine layer; and a presentation layer; the processing circuitry configured to: receive, at the input layer, historical utilization data and consumption-metric data for the compute resource; process the historical utilization data and consumption-metric data in accord with pre-processing defined for the selected domain to generate pre-processed data; store, via a memory resource provided by the data staging layer, the pre-processed data; and determine, at the configuration layer, an adjustment criterion based on the selected domain; at the analytics engine layer: access the pre-processed data and the adjustment criterion; and responsive to the pre-processed data and the adjustment criterion, determine a selected requisition adjustment for the compute resource; at the presentation layer: generate the domain availability indicator responsive to the multiple domains; responsive to the domain selection, initiate a selected virtual representation for the selected domain at the client node; and encapsulate the selected requisition adjustment within the selected recommendation token to initiate presentation of selected efficiency data associated with the selected requisition adjustment within the selected virtual representation.

A2 The system of example A1, where: the network interface circuitry is further configured to receive a credential from the client node; the resource control stack further includes an authentication layer; and the processing circuitry is further configured to verify, at the authentication layer, that the client node has permissions to make requisition changes for the compute resource.

A3 The system of either of examples A1 or A2, where: the network interface circuitry is further configured to send an adjustment token to a requisition control interface for the compute resource to initiate a requisition change for the compute resource; the resource control stack further includes an execution layer; and the processing circuitry is further configured to generate, at the execution layer, the adjustment token based on the selected requisition adjustment.

A4 The system of example A3, where: the network interface circuitry is further configured to receive a feedback command from the client node responsive to the selected recommendation token; and the processing circuitry is further configured to generate, at the execution layer, the adjustment token further based on the feedback command.

A5 The system of example A3, where the adjustment token includes an activation timetable, a reservation matrix, a compute sizing correction adjustment, or any combination thereof.

A6 The system of any of examples A1-A5, where: the multiple domains include a front domain; and the processing circuitry is configured to assign the client node to the front domain at least until the domain selection is received at the network interface circuitry.

A7 The system of example A6, where: the network interface circuitry is configured to send a summary recommendation token to the client node prior to receiving the domain selection; and the processing circuitry is configured to, at the presentation layer: initiate a front virtual representation for the front domain at the client node; and encapsulate requisition adjustments for each of multiple available domains within the summary recommendation token.

A8 The system of any of examples A1-A7, where the processing circuitry is configured to, at the analytics engine layer: determine a specific requisition adjustment associated with a specific domain of the multiple domains, the specific domain different from the selected domain; and alter the selected requisition adjustment when implemented in concert with the specific requisition adjustment.

A9 The system of any of examples A1-A8, where the selected domain is associated with activation state recommendations, compute sizing correction recommendations, committed compute recommendations, or any combination thereof.

A10 The system of any of examples A1-A9, where: the resource control stack further includes an escalation layer; and the processing circuitry is configured to, at the escalation layer: identify when a recommendation token meets an insufficiency criterion; when the insufficiency criterion is met, establishing a communication session between the client node and a technical service node.

A11 The system of example A10, where the insufficiency criterion consists of a threshold level of feedback from the client node A12 The system of any of examples A1-A11, where the compute resource includes a virtual machine, a serverless computing thread, a multiple-component cloud architecture, or any combination thereof.

A13 The system of any of examples A1-A12, where at least one of the multiple domains is configured to provide the compute resource with access to a third-party service for use in concert with the compute resource.

B1 In an example, a method includes: at network interface circuitry: establishing a communication link with a client node; receiving an indication of a compute resource associated with the client node; sending a domain availability indicator designating multiple domains within a resource control environment; receiving a domain selection indicating a selected domain from among the multiple domains; and sending a selected recommendation token to the client node over the communication link; and at processing circuitry: receiving, at an input layer of a resource control stack executing on the processing circuitry, historical utilization data and consumption-metric data for the compute resource; processing the historical utilization data and consumption-metric data in accord with pre-processing defined for the selected domain to generate pre-processed data; storing, via a memory resource provided by a data staging layer of the resource control stack, the pre-processed data; and determining, at a configuration layer of the resource control stack, an adjustment criterion based on the selected domain; at an analytics engine layer of the resource control stack: accessing the pre-processed data and the adjustment criterion; and responsive to the pre-processed data and the adjustment criterion, determining a selected requisition adjustment for the compute resource; at a presentation layer of the resource control stack: generating the domain availability indicator responsive to the multiple domains; responsive to the domain selection, initiating a selected virtual representation for the selected domain at the client node; and encapsulating the selected requisition adjustment within the selected recommendation token to initiate presentation of selected efficiency data associated with the selected requisition adjustment within the selected virtual representation.

B2 The method of example B1, further including: receiving, at the network interface circuitry, a credential from the client node; and verifying, at an authentication layer of the resource control stack, that the client node has permissions to make requisition changes for the compute resource.

B3 The method of either of examples B1 or B2, further including: sending, at the network interface circuitry, an adjustment token to a requisition control interface for the compute resource to initiate a requisition change for the compute resource; and generating, at an execution layer of the resource control stack, the adjustment token based on the selected requisition adjustment.

B4 The method of example B3, further including: receiving, at the network interface circuitry, a feedback command from the client node responsive to the selected recommendation token; and where generating the adjustment token further includes generating the adjustment token based on the feedback command.

C1 In an example, a product includes: machine-readable media other than a transitory signal; instructions stored on the machine-readable media, the instructions configured to, when executed, cause a machine to: at network interface circuitry: establish a communication link with a client node; receive an indication of a compute resource associated with the client node; send a domain availability indicator designating multiple domains within a resource control environment; receive a domain selection indicating a selected domain from among the multiple domains; and send a selected recommendation token to the client node over the communication link; and at processing circuitry: receive, at an input layer of a resource control stack executing on the processing circuitry, historical utilization data and consumption-metric data for the compute resource; process the historical utilization data and consumption-metric data in accord with pre-processing defined for the selected domain to generate pre-processed data; store, via a memory resource provided by a data staging layer of the resource control stack, the pre-processed data; and determine, at a configuration layer of the resource control stack, an adjustment criterion based on the selected domain: at an analytics engine layer of the resource control stack: access the pre-processed data and the adjustment criterion; and responsive to the pre-processed data and the adjustment criterion, determine a selected requisition adjustment for the compute resource; at a presentation layer of the resource control stack: generate the domain availability indicator responsive to the multiple domains; responsive to the domain selection, initiate a selected virtual representation for the selected domain at the client node; and encapsulate the selected requisition adjustment within the selected recommendation token to initiate presentation of selected efficiency data associated with the selected requisition adjustment within the selected virtual representation.

C2 The product of example C1, where: the multiple domains include a front domain; and the instructions are further configured to cause the machine to assign, at the presentation layer, the client node to the front domain at least until the domain selection is received at the network interface circuitry.

C3 The product of example C2, where the instructions are further configured to cause the machine to: send, via the network interface circuitry, a summary recommendation token to the client node prior to receiving the domain selection; and at the presentation layer: initiate a front virtual representation for the front domain at the client node; and encapsulate requisition adjustments for each of multiple available domains within the summary recommendation token.

D1 A method implemented by operation of a system of any of examples A1-A13.

E1 A product comprising instructions stored on a machine readable medium, the instructions configured to cause a machine to implement the method of example D1.

Various implementations have been specifically described. However, many other implementations are also possible.

What is claimed is:
1. A system including:
  network interface circuitry configured to:
    establish a communication link with a client node;
    receive an indication of a compute resource associated with the client node;
    send a domain availability indicator designating multiple domains within a resource control environment;
    receive a domain selection indicating a selected domain from among the multiple domains; and
    send a selected recommendation token to the client node over the communication link; and
  processing circuitry in data communication with the network interface circuitry, the processing circuitry configured to execute a resource control stack including:
    a data staging layer;
    an input layer;
    a configuration layer;
    an analytics engine layer; and
    a presentation layer;
  the processing circuitry configured to:
    receive, at the input layer, historical utilization data and consumption-metric data for the compute resource;
    process the historical utilization data and consumption-metric data in accord with pre-processing defined for the selected domain to generate pre-processed data;
    store, via a memory resource provided by the data staging layer, the pre-processed data; and
    determine, at the configuration layer, an adjustment criterion based on the selected domain;
    at the analytics engine layer:
      access the pre-processed data and the adjustment criterion;
      responsive to the pre-processed data and the adjustment criterion, determine a selected requisition adjustment for the compute resource;
      determine a specific requisition adjustment associated with a specific domain of the multiple domains, the specific domain different from the selected domain; and alter the selected requisition adjustment responsive to the selected requisition adjustment being implemented in concert with the specific requisition adjustment;
at the presentation layer:
generate the domain availability indicator responsive to the multiple domains;
responsive to the domain selection, initiate a selected virtual representation for the selected domain at the client node; and
prior to sending the selected recommendation token, encapsulate the selected requisition adjustment within the selected recommendation token to initiate presentation of efficiency data associated with the selected requisition adjustment within the selected virtual representation.

2. The system of claim 1, where:
the network interface circuitry is further configured to receive a credential from the client node;
the resource control stack further includes an authentication layer; and
the processing circuitry is further configured to verify, at the authentication layer, that the client node has permissions to make requisition changes for the compute resource.

3. The system of claim 1, where:
the network interface circuitry is further configured to send an adjustment token to a requisition control interface for the compute resource to initiate a requisition change for the compute resource;
the resource control stack further includes an execution layer; and
the processing circuitry is further configured to generate, at the execution layer, the adjustment token based on the selected requisition adjustment.

4. The system of claim 3, where:
the network interface circuitry is further configured to receive a feedback command from the client node responsive to the selected recommendation token; and
the processing circuitry is further configured to generate, at the execution layer, the adjustment token further based on the feedback command.

5. The system of claim 3, where the adjustment token includes an activation timetable, a reservation matrix, a compute sizing correction adjustment, or any combination thereof.

6. The system of claim 1, where:
the multiple domains include a front domain; and
the processing circuitry is configured to assign the client node to the front domain at least until the domain selection is received at the network interface circuitry.

7. The system of claim 6, where:
the network interface circuitry is configured to send a summary recommendation token to the client node prior to receiving the domain selection; and
the processing circuitry is configured to, at the presentation layer:
initiate a front virtual representation for the front domain at the client node; and
encapsulate requisition adjustments for each of multiple available domains within the summary recommendation token.

8. The system of claim 1, where the selected domain is associated with a recommended activation state, a recommended compute sizing correction, a recommended committed compute, or any combination thereof.

9. The system of claim 1, where:
the resource control stack further includes an escalation layer; and
the processing circuitry is configured to, at the escalation layer:
identify when a recommendation token meets an insufficiency criterion; and
in response to the insufficiency criterion being met, establish a communication session between the client node and a technical service node.

10. The system of claim 9, where the insufficiency criterion consists of a threshold level of feedback from the client node.

11. The system of claim 1, where the compute resource includes a virtual machine, a serverless computing thread, a multiple-component cloud architecture, or any combination thereof.

12. The system of claim 1, where at least one of the multiple domains is configured to provide the compute resource with access to a third-party service for use in concert with the compute resource.

13. A method including:
at network interface circuitry:
establishing a communication link with a client node;
receiving an indication of a compute resource associated with the client node;
sending a domain availability indicator designating multiple domains within a resource control environment;
receiving a domain selection indicating a selected domain from among the multiple domains; and
sending a selected recommendation token to the client node over the communication link; and
at processing circuitry:
receiving, at an input layer of a resource control stack executing on the processing circuitry, historical utilization data and consumption-metric data for the compute resource;
processing the historical utilization data and consumption-metric data in accord with pre-processing defined for the selected domain to generate pre-processed data;
storing, via a memory resource provided by a data staging layer of the resource control stack, the pre-processed data; and
determining, at a configuration layer of the resource control stack, an adjustment criterion based on the selected domain;
at an analytics engine layer of the resource control stack:
accessing the pre-processed data and the adjustment criterion;
responsive to the pre-processed data and the adjustment criterion, determining a selected requisition adjustment for the compute resource;
determining a specific requisition adjustment associated with a specific domain of the multiple domains, the specific domain different from the selected domain; and
altering the selected requisition adjustment responsive to the selected requisition adjustment being implemented in concert with the specific requisition adjustment;
at a presentation layer of the resource control stack:
generating the domain availability indicator responsive to the multiple domains;

responsive to the domain selection, initiating a selected virtual representation for the selected domain at the client node; and prior to sending the selected recommendation token, encapsulating the selected requisition adjustment within the selected recommendation token to initiate presentation of selected efficiency data associated with the selected requisition adjustment within the selected virtual representation.

14. The method of claim 13, further including:

receiving, at the network interface circuitry, a credential from the client node; and verifying, at an authentication layer of the resource control stack, that the client node has permissions to make requisition changes for the compute resource.

15. The method of claim 13, further including:

sending, at the network interface circuitry, an adjustment token to a requisition control interface for the compute resource to initiate a requisition change for the compute resource; and generating, at an execution layer of the resource control stack, the adjustment token based on the selected requisition adjustment.

16. The method of claim 15, further including:

receiving, at the network interface circuitry, a feedback command from the client node responsive to the selected recommendation token; and where generating the adjustment token further includes generating the adjustment token based on the feedback command.

17. A product including:

non-transitory machine-readable media;

instructions stored on the non-transitory machine-readable media, the instructions configured to, when executed, cause a machine to:

at network interface circuitry:
  establish a communication link with a client node;
  receive an indication of a compute resource associated with the client node;
  send a domain availability indicator designating multiple domains within a resource control environment;
  receive a domain selection indicating a selected domain from among the multiple domains; and
  send a selected recommendation token to the client node over the communication link; and at processing circuitry:
  receive, at an input layer of a resource control stack executing on the processing circuitry, historical utilization data and consumption-metric data for the compute resource;
  process the historical utilization data and consumption-metric data in accord with pre-processing defined for the selected domain to generate pre-processed data;
  store, via a memory resource provided by a data staging layer of the resource control stack, the pre-processed data; and determine, at a configuration layer of the resource control stack, an adjustment criterion based on the selected domain;
  at an analytics engine layer of the resource control stack:
    access the pre-processed data and the adjustment criterion;
    responsive to the pre-processed data and the adjustment criterion, determine a selected requisition adjustment for the compute resource;
    determine a specific requisition adjustment associated with a specific domain of the multiple domains, the specific domain different from the selected domain; and
    alter the selected requisition adjustment responsive to the selected requisition adjustment being implemented in concert with the specific requisition adjustment;
  at a presentation layer of the resource control stack:
    generate the domain availability indicator responsive to the multiple domains;
    responsive to the domain selection, initiate a selected virtual representation for the selected domain at the client node; and
    prior to sending the selected recommendation token, encapsulate the selected requisition adjustment within the selected recommendation token to initiate presentation of selected efficiency data associated with the selected requisition adjustment within the selected virtual representation.

18. The product of claim 17, where:

the multiple domains include a front domain; and the instructions are further configured to cause the machine to assign, at the presentation layer, the client node to the front domain at least until the domain selection is received at the network interface circuitry.

19. The product of claim 18, where the instructions are further configured to cause the machine to:

send, via the network interface circuitry, a summary recommendation token to the client node prior to receiving the domain selection; and at the presentation layer:
  initiate a front virtual representation for the front domain at the client node; and
  encapsulate requisition adjustments for each of multiple available domains within the summary recommendation token.

20. The product of claim 17, where:

the resource control stack further includes an escalation layer; and the instructions are further configured to cause the machine to, at the escalation layer:
  identify when a recommendation token meets an insufficiency criterion; and
  in response to the insufficiency criterion being met, establish a communication session between the client node and a technical service node.

* * * * *